(12) United States Patent
Watanabe et al.

(10) Patent No.: US 6,463,781 B2
(45) Date of Patent: Oct. 15, 2002

(54) SYSTEM FOR DRAWING OUTER CYLINDER OF RUBBER BUSH

(75) Inventors: Toshihiro Watanabe, Osaka (JP); Osamu Nakai, Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 0 days.

(21) Appl. No.: 09/777,795

(22) Filed: Feb. 6, 2001

(65) Prior Publication Data

US 2002/0073760 A1 Jun. 20, 2002

(30) Foreign Application Priority Data

Dec. 14, 2000 (JP) .......................................... 2000-380021

(51) Int. Cl.$^7$ ............................................. B21D 43/20
(52) U.S. Cl. ........................... 72/424; 72/16.4; 72/17.3; 72/82; 72/405.13; 72/405.16; 72/422; 414/796.7; 414/796.9; 700/109; 700/114
(58) Field of Search ............................ 72/4, 16.2, 16.3, 72/16.4, 17.3, 18.1, 18.2, 82, 83, 405.12, 405.13, 405.16, 421, 422, 424; 700/109, 110, 114, 175; 414/796.5, 796.7, 796.9

(56) References Cited

U.S. PATENT DOCUMENTS

| | | | |
|---|---|---|---|
| 4,651,430 A | * 3/1987 | Vasku | 33/178 D |
| 4,936,129 A | 6/1990 | Lipper et al. | |
| 4,953,575 A | 9/1990 | Tervamäki | |
| 5,085,515 A | * 2/1992 | Itoh et al. | 72/4 |
| 5,226,778 A | * 7/1993 | Sekitani | 414/744.3 |
| 5,292,224 A | * 3/1994 | Torii et al. | 414/796.4 |
| 5,301,528 A | 4/1994 | Hofmann et al. | |
| 5,443,358 A | * 8/1995 | Yanniello | 414/796.9 |
| 5,471,858 A | 12/1995 | Deriaz | |
| 5,937,516 A | 8/1999 | De Sousa et al. | |
| 5,960,661 A | * 10/1999 | Massee | 72/83 |
| 6,038,901 A | 3/2000 | Stein et al. | |
| 6,138,342 A | * 10/2000 | Kuze | 72/4 |

* cited by examiner

*Primary Examiner*—Ed Tolan
(74) *Attorney, Agent, or Firm*—Jordan and Hamburg LLP

(57) ABSTRACT

A system for drawing an outer cylinder of a rubber bush comprising an inner cylinder serving as a shaft member, the outer cylinder disposed around the inner cylinder and a rubber elastic body interposed between the inner cylinder and the outer cylinder, comprising first and second turning tables each having at least two piling portions on which the rubber bushes to be drawn are piled up in a vertical direction; first and driving apparatuses for bringing up the rubber bushes piled up on the piling portion of the first and second turning tables to a predetermined robot grasping position; a drawing apparatus having a die for drawing the outer cylinder of the rubber bush; a robot apparatus for grasping and transferring the rubber bush located at the robot grasping position to set the same to a predetermined position of the die; a control apparatus for controlling the robot apparatus such that the rubber bushes from the piling portion of one of the first and second turning tables are sequentially transferred to the die, and if the transfer of all the former rubber bushes from the piling portion was completed, the rubber bushes from the piling portion of the other one of the first and second turning tables and transferred.

5 Claims, 9 Drawing Sheets

(A)

(B)

(A)

(B)

(A)

(B)

SYSTEM FOR DRAWING OUTER CYLINDER OF RUBBER BUSH

BACKGROUND OF THE INVENTION

1. Field of the Invention

The present invention relates to a system for drawing an outer cylinder of a rubber bush comprising an inner cylinder serving as a shaft member, the outer cylinder disposed around the inner cylinder and a rubber elastic body interposed between the inner cylinder and the outer cylinder.

2. Description of the Related Art

An outer appearance of the rubber bush is shown in FIGS. 1. This rubber bush 1 is used for a connecting portion of an automobile such as a suspension, and comprises a metal inner cylinder 2 serving as a shaft member, a metal outer cylinder 3 coaxially disposed around the inner cylinder 2, and an elastic body such as a rubber 4 interposed in the space between the inner cylinder 2 and the outer cylinder 3.

A molding process of the rubber bush 1 will be explained briefly. First, the inner cylinder 2 and the outer cylinder 3 are positioned in predetermined positions in a forming die. Then, rubber material is charged into the forming die an injection molding method or the like. With this process, the rubber bush 1 having a shape shown in FIG. 1 can be formed. After the rubber bush 1 is taken out from the forming die, the rubber 4 shrinks and thus, an outer peripheral portion of the rubber 4 and an inner peripheral surface 3a try to separate from each other. To prevent the separation of the rubber 4 and the outer cylinder 3, adhesive is applied to the inner peripheral surface 3a of the outer cylinder 3, thereby preventing the rubber 4 and the outer cylinder 3 from separating from each other.

However, the rubber 4 still tries to shrink after the formation, residual distortion remains in the rubber bush 1, and this residual distortion adversely affects quality of the rubber bush 1. Thereupon, in order to eliminate the residual distortion, the outer cylinder 3 is subjected to drawing working to reduce its diameter. For this purpose, a system for drawing the outer cylinder of the rubber bush 1 is known. A structure of conventional the system is shown in FIGS. 9.

FIG. 9A is a plan view of the system. This system comprises a turning table 100 on which a large number of formed rubber bush 1 are on standby, a drawing apparatus 101 for drawing an outer cylinder of the rubber bush 1, and a robot apparatus 102 for transferring the rubber bush 1 from the turning table 100 to the drawing apparatus 101.

The turning table 100 is provided with six piling portions 100A, 100B, . . . along the circumferential direction of the turning table 100. As shown in FIG. 9B, a plurality of rubber bushes 1 are piled up in the vertical direction on the piling portion. A chuck member 102a of the robot apparatus 102 grasps the rubber bush 1 located at a height of a robot grasping position of the piling portion 100A and transfers it to the drawing apparatus 101. The rubber bush 1 located at the grasping position is shown with a symbol 1A.

If the rubber bush 1 at the grasping position was transferred, the chuck member 102a sets a next rubber bush (located immediately below the transferred rubber bush) to a grasping position, a pushing-up member 103 is driven upward by means of a linear motor or the like. With this operation, the next chuck operation is ready.

At present, three rubber bushes 1 are piled up on the piling portion 100A, and if all of the rubber bushes 1 are transferred by the robot apparatus 102, the rubber bushes 1 on the other piling portion 100B are transferred.

The action in such a case will be explained. First, the pushing-up member 103 is driven downward for standby (shown with phantom line).

Next, the turning table 100 is turned in a direction of an arrow (clockwise direction) to move the piling portion 100B to a position where the piling portion 100A existed. A turning amount of the turning table 100 is about 60° in the example shown in FIG. 9A. Then, the pushing-up member 103 is driven upward again, and one of the uppermost rubber bush 1 is grasped and set to the grasping position. Thereafter, the robot apparatus 102 restarts the transfer operation.

However, the above structure has the following problem. That is, when the piling portions are switched, an operation for retreating the pushing-up member 103 and an operation for turning the turning table 100 through a predetermined angle are required. Therefore, cycle time for transferring the rubber bush becomes longer when the piling portions are switched, which lowers productivity. More specifically, the cycle time when the piling portions are not switched can be some seconds, but if the piling portions are switched, the Cycle time is deferred to about 20 seconds.

SUMMARY OF THE INVENTION

Thereupon, it is an object of the present invention to provide a system for drawing an outer cylinder of a rubber bush having high operational efficiency and capable of maintaining the same cycle time even if piling portions are switched or not switched.

To achieve the above object, there is provided a system for drawing an outer cylinder of a rubber bush comprising an inner cylinder serving as a shaft member, the outer cylinder disposed around the inner cylinder and a rubber elastic body interposed between the inner cylinder and the outer cylinder, comprising a first turning table having at least two piling portions on which the rubber bushes to be drawn are piled up in a vertical direction;

a second turning table having at least two piling portions on which the rubber bushes to be drawn are piled up in a vertical direction;

a first driving apparatus for bringing up the rubber bushes piled up on the piling portion of the first turning table to a predetermined robot grasping position;

a second driving apparatus for bringing up the rubber bushes piled up on the piling portion the second turning table to a predetermined robot grasping position;

a drawing apparatus having a die for drawing the outer cylinder of the rubber bush;

a robot apparatus for grasping and transferring the rubber bush located at the robot grasping position to set the same to a predetermined position of the die;

a control apparatus for controlling the robot apparatus such that the rubber bushes from the piling portion of one of the first and second turning tables are sequentially transferred to the die, and if the transfer of all the former rubber bushes from the piling portion was completed, the rubber bushes from the piling portion of the other one of the first and second turning tables and transferred.

The system of the present invention includes the first and second turning tables each having at least two piling portions on which the rubber bushes to be drawn are piled up in a vertical direction. The robot apparatus grasps and transfers the rubber bush located at the robot grasping position to the die of the drawing apparatus.

Here, it is supposed the robot apparatus sequentially transfers the rubber bushes from the piling portion of the first turning table. If all the rubber bushes piled up on the piling portion are transferred, it is necessary to switch the piling portions. At that time, the piling portion of the second turning table is selected as the piling portion on which the next rubber bush is to be transferred. While the rubber bushes are transferred from the first turning table, the second turning table can finish setting the rubber bushes to the robot grasping position. Therefore, during the switching of the piling portions, there is no loss of time by the rotating operation of the turning table and the operation of the driving apparatus. While the rubber bushes are transferred from the second turning table, the first turning table can finish setting rubber bushes to the robot grasping position. Thereafter, the transfer from the first turning table and the transfer from the second turning table are alternately repeated.

As described above, it is possible to provide a system for drawing the outer cylinder of the rubber bush capable of maintaining the same cycle time even if piling portions are switched or not switched.

As a first embodiment of the invention, it is preferable that the piling portions are provided in plural along a circumferential direction of the turning table.

By arranging the piling portions along the circumferential direction, it is possible to set the rubber bush of a predetermined piling portion to the robot grasping position by rotating the turning table.

As a second embodiment of the invention, it is preferable that each of the first and second driving apparatus includes a linear motor, and after the uppermost rubber bush of the piling portion located on the robot grasping position was transferred by the robot apparatus, the next rubber bush is brought up so as to position the next rubber bush to the robot grasping position.

With this structure, if the linear motor is driven to rise the position to the height of the rubber bush, a rubber bush to be transferred next can be stayed on standby at the robot grasping position swiftly. With this feature, a desired cycle time can be realized.

As a third embodiment of the invention, it is preferable that the drawing apparatus includes a clamping mechanism for clamping the die to a die support base, thereby making it possible to detach the die from the die support base.

There are various shapes of rubber bush depending upon vehicle types. If the shape of the rubber bush is different, the die for drawing the bush must be changed accordingly. According to the above structure, since the die is only clamped to the die support base, it is possible to replace the die in a short time.

As a fourth embodiment of the invention, it is preferable that the system further comprises an inspection apparatus for inspecting a size of the outer cylinder of the rubber bush which was worked by the drawing apparatus;

a first passage for sending out the rubber bush which was judged as being a good product as a result of the inspection;

a second passage for sending out the rubber bush which as judged as being a bad produce as the result of the inspection; and a switching mechanism for switching the first and second passages to which the rubber bush is sent out in accordance with the inspection result of the inspection apparatus.

After the outer cylinder of the rubber bush is drawn by the drawing apparatus, it is necessary to inspect whether the outer cylinder was drawn into a predetermined size. For this purpose, the inspection apparatus is provided. As a result of the inspection of the inspection apparatus, a good rubber bush is sent out to the first passage, and a bad rubber bush is sent out to the second passage. The switching mechanism is provided for sending out the inspected rubber bush to one of the passages. The operation of the switching mechanism is controlled based on the result of the inspection apparatus. With this feature, it is possible to reliably distinguish between good products and bad products.

As a fifth embodiment of the invention, it is preferable that the inspection apparatus comprises a snap gage, and judging means for judging that the rubber bush which could be snapped by the snap gage is the good product and the rubber bush which could not be snapped is the bad product.

If the outer cylinder of the rubber bush is drawn, the outer diameter of the outer cylinder may become greater than specs (managed value) due to wear of the die in some cases. If the outer cylinder is within the specs, the outer cylinder of the rubber bush can be snapped by the snap gage. If the outer diameter of the outer cylinder is greater than the specs, it can not be snapped by the snap gage. Therefore, it is possible to judge that a rubber bush that can not be snapped by the snap gage is a bad product.

As a sixth embodiment of the invention, it is preferable that the snap gage can move from a first position to a second position when the rubber bush is a good product, and can not move from the first position to the second position when the rubber bush is a bad product, the system is provided with a sensor for detecting a movement from the first position to the second position, and the switching mechanism is controlled based on a result of an output from the sensor.

If a rubber bush is good, since the outer cylinder thereof can be snapped by the snap gage, the snap gage can move from the first position to the second position. If the rubber bush is bad, the outer cylinder thereof can not be snapped by the snap gage, the snap gage can not move to the second position. Thereupon, the sensor for detecting the movement of the snap gage is provided, an output signal of the sensor is monitored, and it is possible to judge whether the rubber bush is good.

As a seventh embodiment of the invention, it is preferable that the system further comprises a gage support body for supporting the snap gage, the snap gage is attachable and detachable to and from the gage support body.

As described above, there are various shapes of rubber bush depending upon vehicle types. Therefore,it is necessary to prepare various snap gages so as to meet the shape of the rubber bush. By forming the snap gage such that the snap gage can be attached to and detached from the gage support body, it is easy to accept the change of the rubber bush to be drawn.

As an eighth embodiment of the invention, it is preferable that the robot apparatus comprises a chuck member for grasping the rubber bush located at the robot grasping position, and a chuck member support body for detachably supporting the chuck member.

It is also necessary that the chuck member for grasping the rubber bush can meet the different shape of the rubber bush. If various chuck members are prepared and the chuck member is formed such that the chuck member can be attached to and detached from the chuck member support body, it is easy to accept the change of the rubber bush to be drawn.

As a ninth embodiment of the invention, it is preferable that the robot apparatus comprises a chuck member for grasping the rubber bush located at the robot grasping position, and a chuck member driving mechanism capable of changing a chuck margin of the chuck member.

Instead of detachably forming the chuck member, the chuck margin of the chuck member may be changed. The chuck member may be driven by the chuck member driving mechanism to change the chuck margin. With this feature, it is easy to accept the change of the rubber bush to be drawn.

Other features and advantages of the present invention will become apparent in the following description and the accompanying drawings.

DETAILED DESCRIPTION OF THE PREFERRED EMBODIMENTS

Embodiments of the present invention will be explained in detail with reference to the drawings.

Figure 1:
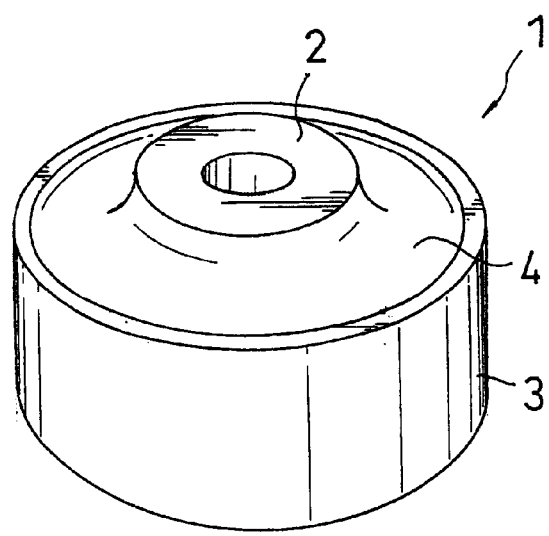
FIG. 1A is a perspective view showing an outer appearance of a rubber bush.
FIG. 1B is a sectional view of the rubber bush.
Figure 1:
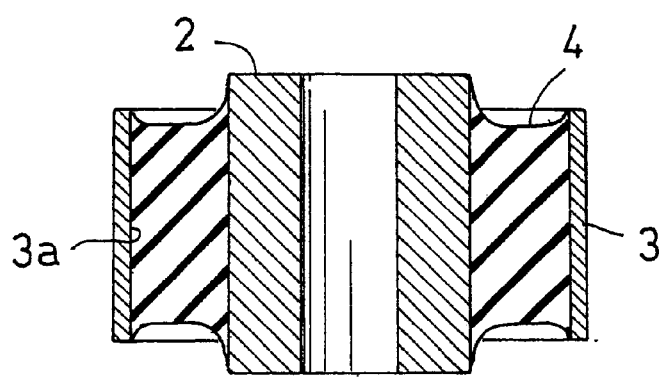

As explained above, an outer appearance of the rubber bush is shown in FIG. 1. This rubber bush 1 is used for a connecting portion of an automobile such as a suspension, and comprises a metal inner cylinder 2 serving as a shaft member, a metal outer cylinder 3 coaxially disposed around the inner cylinder 2, and an elastic body such as a rubber 4 interposed in the space between the inner cylinder 2 and the outer cylinder 3. Of course, the rubber bush intended by the invention is not limited to the appearance of FIG. 1.

Figure 2:
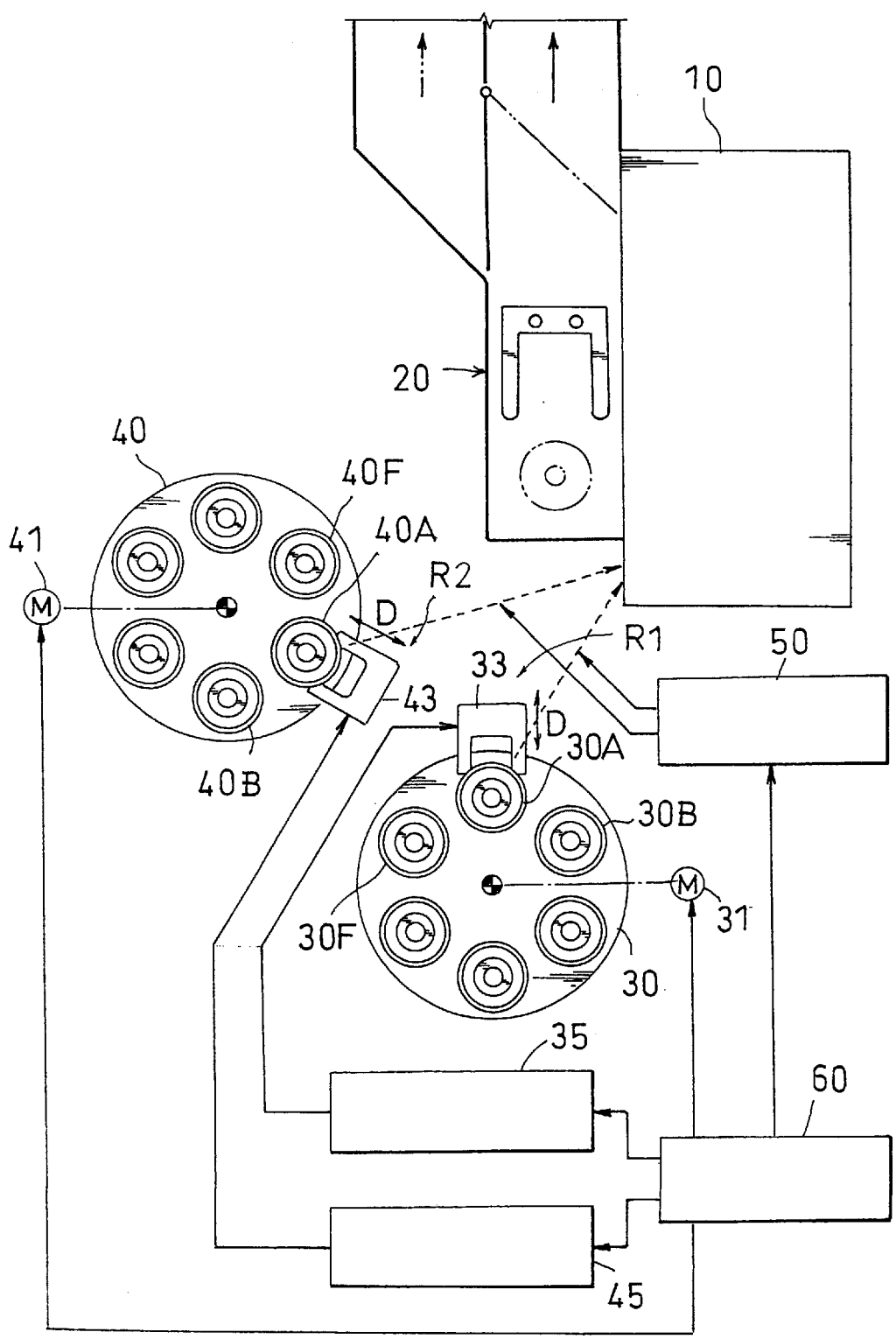
FIG. 2 is a plane view schematically showing a structure of the system for drawing an outer cylinder of the rubber bush.

FIG. 2 is a plane view schematically showing a structure of the system for drawing an outer cylinder of the rubber bush.

This system includes a drawing apparatus 10, an inspecting apparatus 20, a first turning table 30, a second turning table 40, a robot apparatus 50 and a control apparatus 60.

The drawing apparatus 10 includes a die for drawing the outer cylinder 3 of the rubber bush 1. The inspecting apparatus 20 inspects an outer diameter of the outer cylinder 3 of the drawn rubber bush 1. The first and second turning tables 30 and 40 are on standby in a state in which a large number of rubber bushes 1 are piled up thereon. The robot apparatus 50 transfers the rubber bush 1 from the first and second turning tables 30 and 40 to the drawing apparatus 10. The control apparatus 60 controls operation of the drawing apparatus 10, the inspecting apparatus 20, the first and second turning tables 30 and 40, the robot apparatus 50 and the like.

A structure of each member will be explained in detail.

Figure 4:
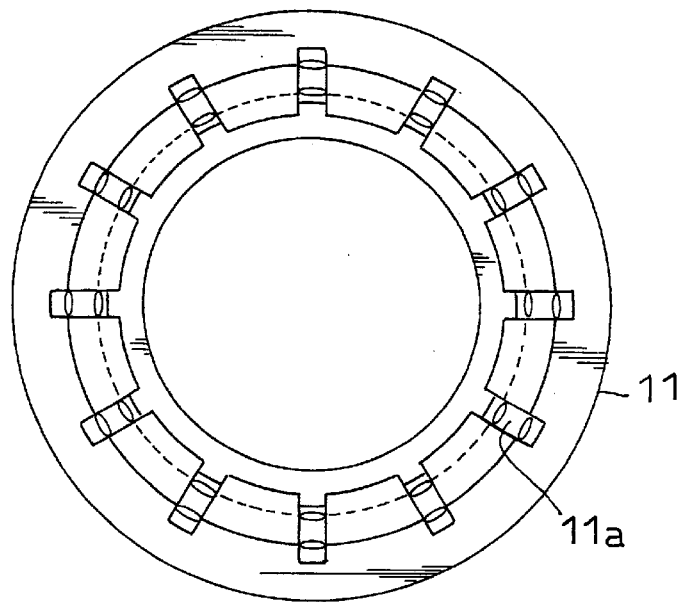
FIG. 4A is a plan view showing a structure of a stationary die provided in a drawing apparatus.
FIG. 4B is a sectional view showing the structure of the stationary die provided in the drawing apparatus.
Figure 4:
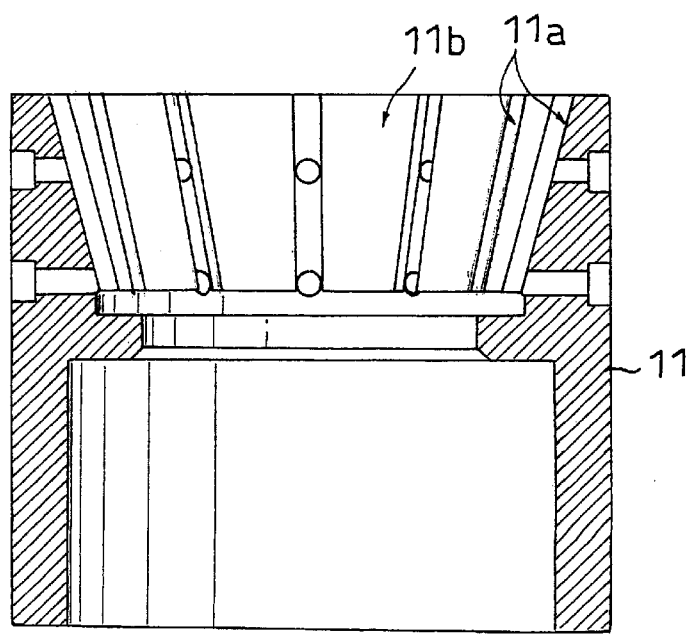
Figure 5:
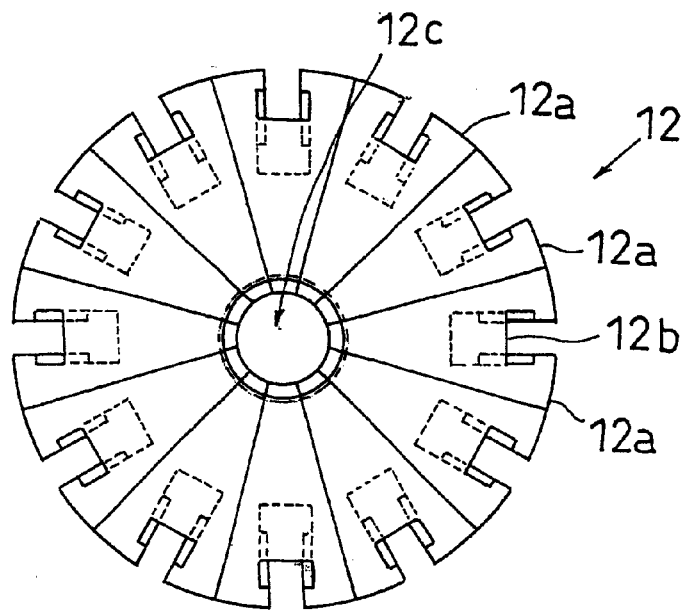
FIG. 5A is a plane view showing a structure of a moving die.
FIG. 5B is a sectional view showing the structure of the moving die.
Figure 5:
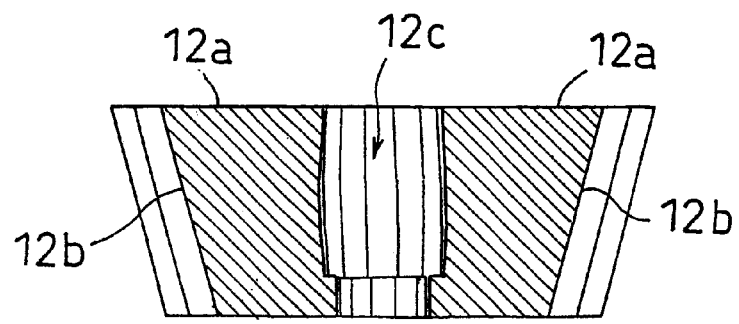

FIGS. 4 and 5 show a structure of a die provided in the drawing apparatus 10. FIG. 4A is a plan view of a stationary die 11, and FIG. 4B is a sectional view of the stationary die 11. A central space of the stationary die 11 functions as a product working section 11b. The stationary die 11 is formed with 12 guide portions 11a at equal distances from one another along its circumferential direction.

FIG. 5A is a plan view of a moving die 12, and FIG. 5B is a sectional view of the moving die 12. The moving die 12 comprises a large number of (12) moving die members 12a arranged in its circumferential direction. The moving die members 12a include guide portions 12b at positions corresponding to the guide portions 11a of the stationary die 11. A working space 12c in which the rubber bush to be drawn is disposed is formed in a central portion of the moving die 12. The moving die 12 is mounted to the product working section 11b of the stationary die 11 such that the moving die 12 can move along the guide portions 11a. It is preferable to provide a ball member for smoothly moving the moving die 12 along the guide portions 11a.

When the moving die members 12a is located above the guide portions 11a, a diameter of the working space 12c of the moving die 12 is greater than an outer diameter of the outer cylinder of the rubber bush to be worked. By sliding the moving die members 12a along the guide portions 11a from above downward, the diameter of the working space 12c is reduced. With this action, it is possible to draw the outer cylinder of the rubber bush. The moving die members 12a is biased upward by a spring mechanism (not shown).

Figure 6:
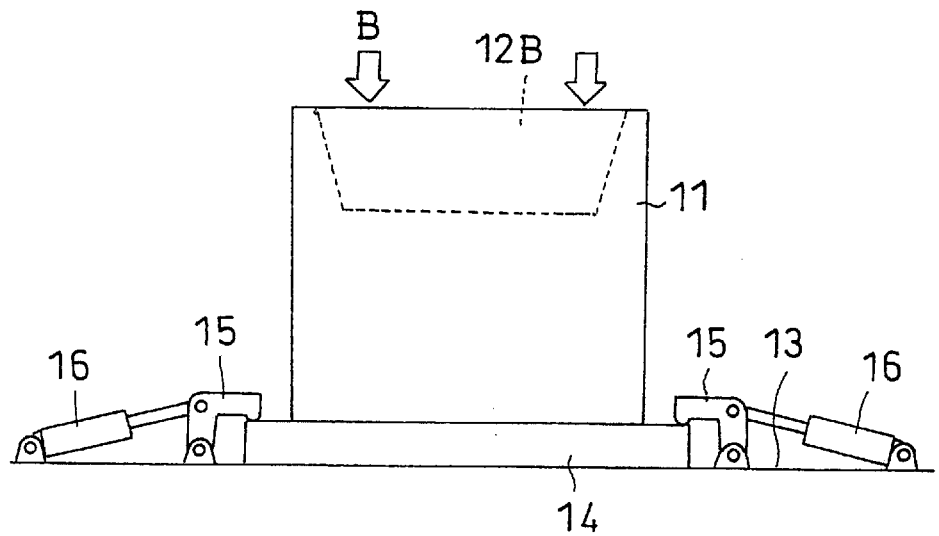
FIG. 6A is a side view showing a mounting structure of the die.
FIG. 6B is a plan view showing the mounting structure of the die.
Figure 6:
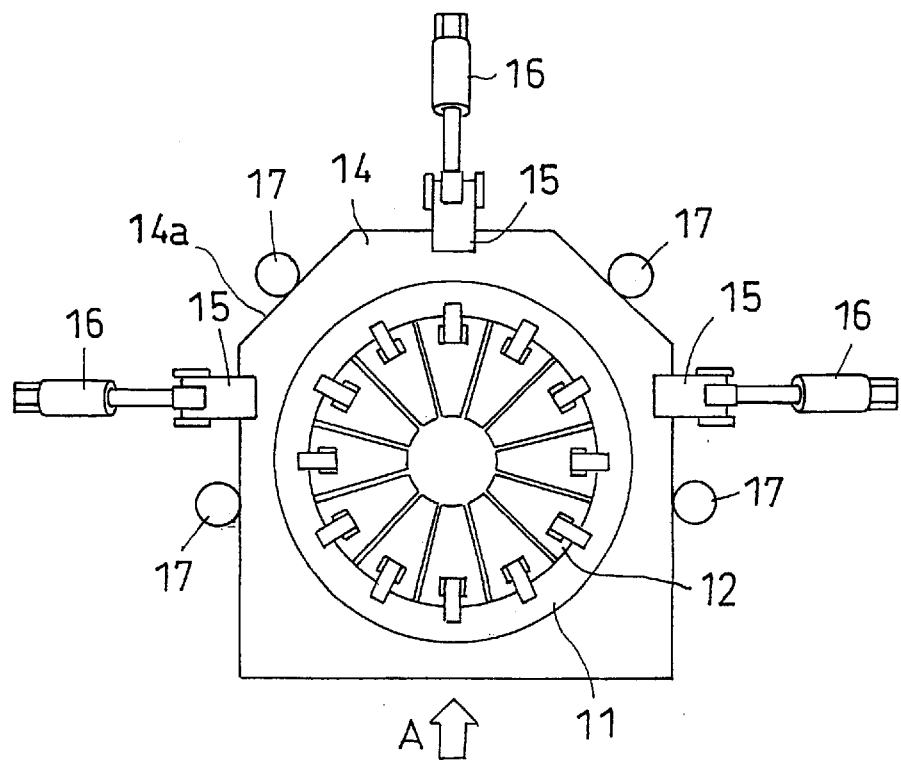

FIG. 6 is a schematic view showing a mounting structure of the die. FIG. 6A is a side view, and FIG. 6B is a plan view. The stationary die 11 is fastened onto a mounting support base 14 by a bolt. The mounting support base 14 is clamped on an upper portion of a pressing base 13 (which functions as a die support base) by means of a clamping mechanism.

An example of the clamping mechanism is a structure in which substantially L-shaped clamp members 15 rotatably supported by the pressing base 13 are driven by a hydraulic cylinder 16. FIG. 6B shows a positioning mechanism for positioning the mounting support base 14 on which the stationary die 11 is fastened with respect to the pressing base. That is, a plurality of positioning pins 17 are fixed to the pressing base 13. The mounting support base 14 is slid from below (arrow A) in FIG. 6B, and the mounting support base 14 is clamped by the clamp members 15 at a position where slant portions 14a abut against the positioning pins 17, thereby positioning the mounting support base 14. The clamp member 15 is provided at three positions in the drawings, but the present invention is not limited to this.

By fixing the dies by the clamping mechanism, it is possible to easily exchange the dies. When a rubber bush having different shape is to be drawn, it is necessary to exchange the dies correspondingly. According to the above structure, it is possible to exchange the dies easier and the exchanging time can be shortened as compared with a structure in which the dies are fixed to the pressing base 13 by bolts.

When the drawing working is carried out, a force shown with an arrow B in FIG. 6A is applied to the moving die 12, and the moving die 12 is worked along the guide portions 11a and 12b. With this operation, a diameter of the central working space 12c of the moving die 12 is reduced and thus, the outer cylinder of the rubber bush can be worked.

Next, the turning tables will be explained. As shown in FIG. 2, there are provided the first turning table 30 and the second turning table 40 are provided. The first turning table 30 is provided with piling portions 30A, 30B, . . . 30F at equal distances from one another along its circumferential direction. Similarly, the second turning table 40 is also provided with piling portions 40A, 40B, . . . 40F. The first and second turning tables 30 and 40 are rotated in the counterclockwise direction by means a first motor 31 and a second motor 41, respectively.

In FIG. 2, an area where the piling portion 30A of the first turning table 30 is currently located functions as a first robot grasping position R1. An area where the piling portion 40A of the second turning table 40 is currently located functions as a second robot grasping position R2. The robot grasping positions R1 and R2 are positions where the robot apparatus 50 grasps the rubber bush.

Figure 3:
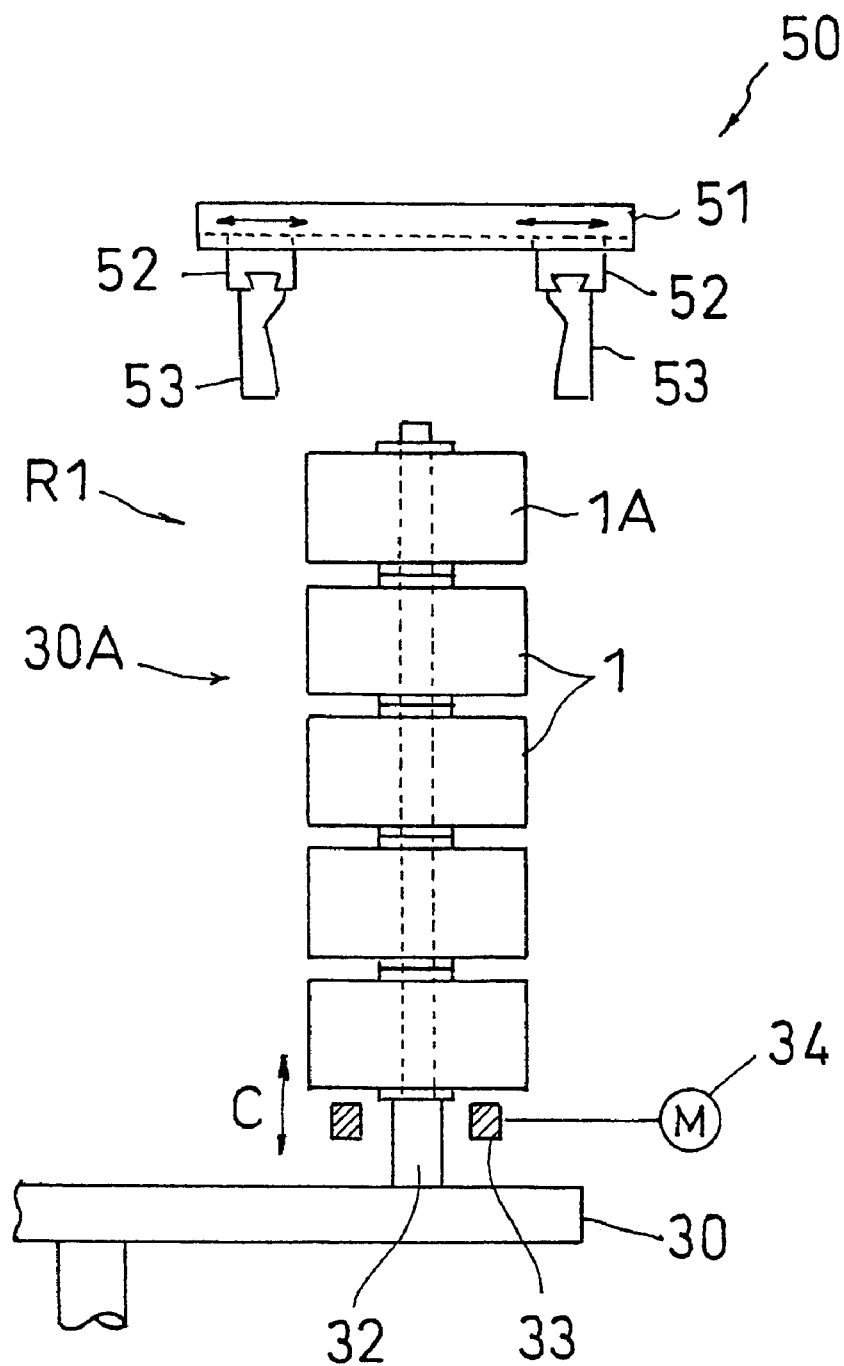
FIG. 3 is a diagram showing a structure of a piling portion of a turning table and a structure of a robot apparatus.

FIG. 3 shows a structure of the piling portion 30A of the first turning table 30, but other piling portions have the same structure. The piling portion 30A is provided with a shaft 32 which is inserted into the inner cylinder 2 of the rubber bush 1. The shaft 32 passes through the large number of (five in FIG. 3) rubber bushes 1 in the vertical direction. The shaft 32 comprises a large-diameter portion and a small-diameter portion. An outer diameter of the large-diameter portion is greater then an inner diameter of the inner cylinder of the rubber bush. With this design, the lowermost rubber bush of the piling portion can not move downward of a position shown in FIG. 3. A lower space of the lowermost rubber bush can be utilized as a standby space for a pushing-up member 33.

The pushing-up member 33 is provided below the piled up rubber bushes 1. As shown in FIG. 2, the pushing-up member 33 is formed into substantially U-shape as viewed from above, and the pushing-up member 33 can come in and out with respect to the shaft 32 in a direction of an arrow D. When the first turning table 30 is rotated, the pushing-up member 33 is moved in the D direction so that the shaft 32 does not interfere with the pushing-up member 33.

The pushing-up member 33 can be moved in the vertical direction by a linear motor 34. By moving the pushing-up member 33 upward, the rubber bush 1 can be moved upward. The linear motor 34 may be driven by a known method.

In FIG. 3, a position (shown with a symbol 1A) of the uppermost rubber bush of the piling portion 30A corresponds to a robot grasping position R1. The robot apparatus 50 can grasp the rubber bush 1 at the robot grasping position R1 and transfer the same to the drawing apparatus 10.

A structure of the robot apparatus 50 is simply shown in FIG. 3. The robot apparatus 50 comprises a chuck member 53 for grasping the rubber bush 1 located at the robot grasping position R1, a chuck member support body 52 for supporting the chuck member 53, and a chuck member driving mechanism 51 for driving the chuck member support body 52 in a direction of arrow in the drawing.

The chuck member 53 is supported in a dovetail groove formed in the chuck member support body 52. The chuck member 53 is attachable and detachable with respect to the dovetail groove. Therefore, when a rubber bush having different shape is used, the chuck member 53 may be replaced by another member having shape corresponding to that of the rubber bush. With this design, it is easy to meet the change in shape of the rubber bush to be drawn. In the chuck member driving mechanism 51, a linear motor may be provided to slide and move the chuck member support body 52 for example. The chuck member support body 52 may be driven using a hydraulic cylinder. If a driving range of the chuck member 53 by the chuck member driving mechanism 51 is secured sufficiently, it is possible to meet the change in shape of the rubber bush without exchanging the chuck member 53.

The robot apparatus 50 transfers a rubber bush 1 located at the first robot grasping position R1 or a rubber bush 1 located at the second robot grasping position R2 to a predetermined position of the die of the drawing apparatus 10. A portion of the robot apparatus 50 which is not illustrated in the drawings may be of a known structure.

FIG. 2 shows that a first driving apparatus 35 for driving the pushing-up member 33 is a black box. The first driving apparatus 35 includes a mechanism such as the linear motor 34 as explained above. The second turning table 40 also includes a pushing-up member 43 and a second driving apparatus 45 like the first turning table 30.

Figure 7:
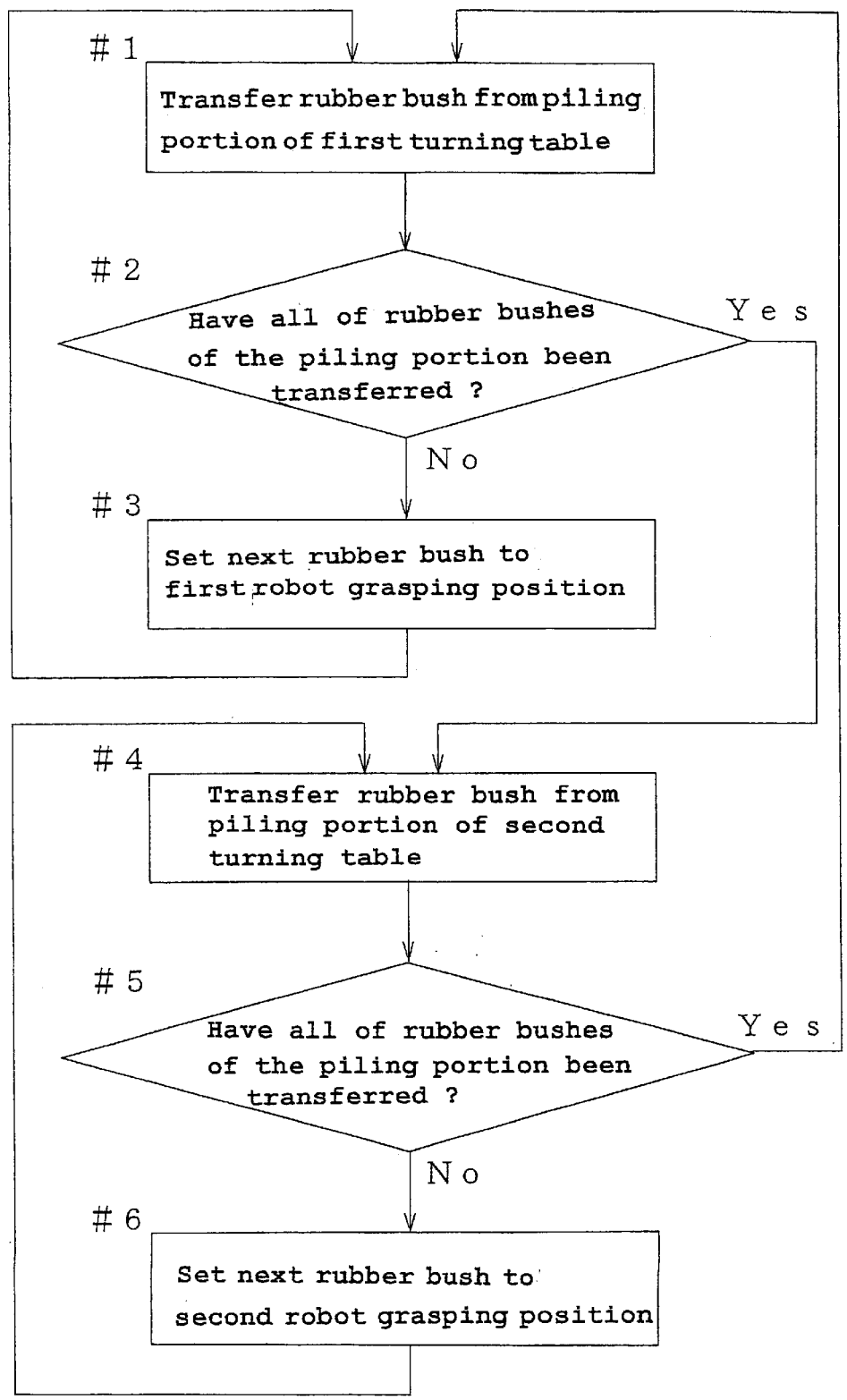
FIG. 7 is a flowchart showing a procedure when the rubber bush is transferred from the turning table to the drawing apparatus.

Here, the control of the robot apparatus 50 and the first and second turning tables 30 and 40 by means of the control apparatus 60 will be explained. FIG. 7 shows a control flowchart. The control apparatus 60 includes therein a computer in which control program is stored.

It is supposed that the rubber bush 1 is transferred from the piling portion 30A of the first turning table 30 to the drawing apparatus 10 (#1). The chuck member 53 of the robot apparatus 50 chucks the rubber bush 1 located at the first robot grasping position R1, and transfers the same to the drawing apparatus 10.

Next, it is judged whether all the rubber bushes 1 located at the piling portion 30A have been transferred (#2). If all have not yet been transferred (when rubber bushes to be transferred are still remained), a next rubber bush 1 is set to the first robot grasping position R1 (#3). For this purpose, the linear motor 34 is driven to rise the pushing-up member 33, thereby setting the uppermost rubber bush 1 to the first robot grasping position R1. Thereafter, the flow returns to step #1.

In step #2, if all rubber bushes 1 have been transferred, the robot apparatus 50 transfers the rubber bush from the piling portion 40A of the second turning table 40. This point is one feature of the present invention. If there exists only one turning table, when all rubber bushes located on one piling portion have been transferred, rubber bushes on another piling portion of the same turning table must be transferred. For this purpose, the pushing-up member 33 is one retreated and then, the turning table must be rotated through a predetermined angle. Then, the pushing-up member 33 is set to a lower face of the lowermost rubber bush on the piling portion again, the pushing-up member 33 is brought up, and the uppermost rubber bush on the piling portion is set to the robot grasping position.

Therefore, it takes a long time until rubber bushes on another piling portion are set, and it is necessary to keep the robot apparatus 50 on standby until the rubber bushes are set. Therefore, during switching of the piling portions, there is a problem that the cycle time for drawing the rubber bushes becomes long.

Whereas, in the present invention, the robot apparatus 50 does not require standby time for switching the rubber bush such as to transfer the bushes on the piling portion of another turning table. Therefore, the cycle time does not become long when the piling portions are switched.

In the embodiment shown in FIG. 2, there are two turning tables, it is apparent that the object of the invention can be achieved even if three or more turning tables are provided. In other words, a structure having three or more turning tables is also within a scope of this invention.

Figure 8:
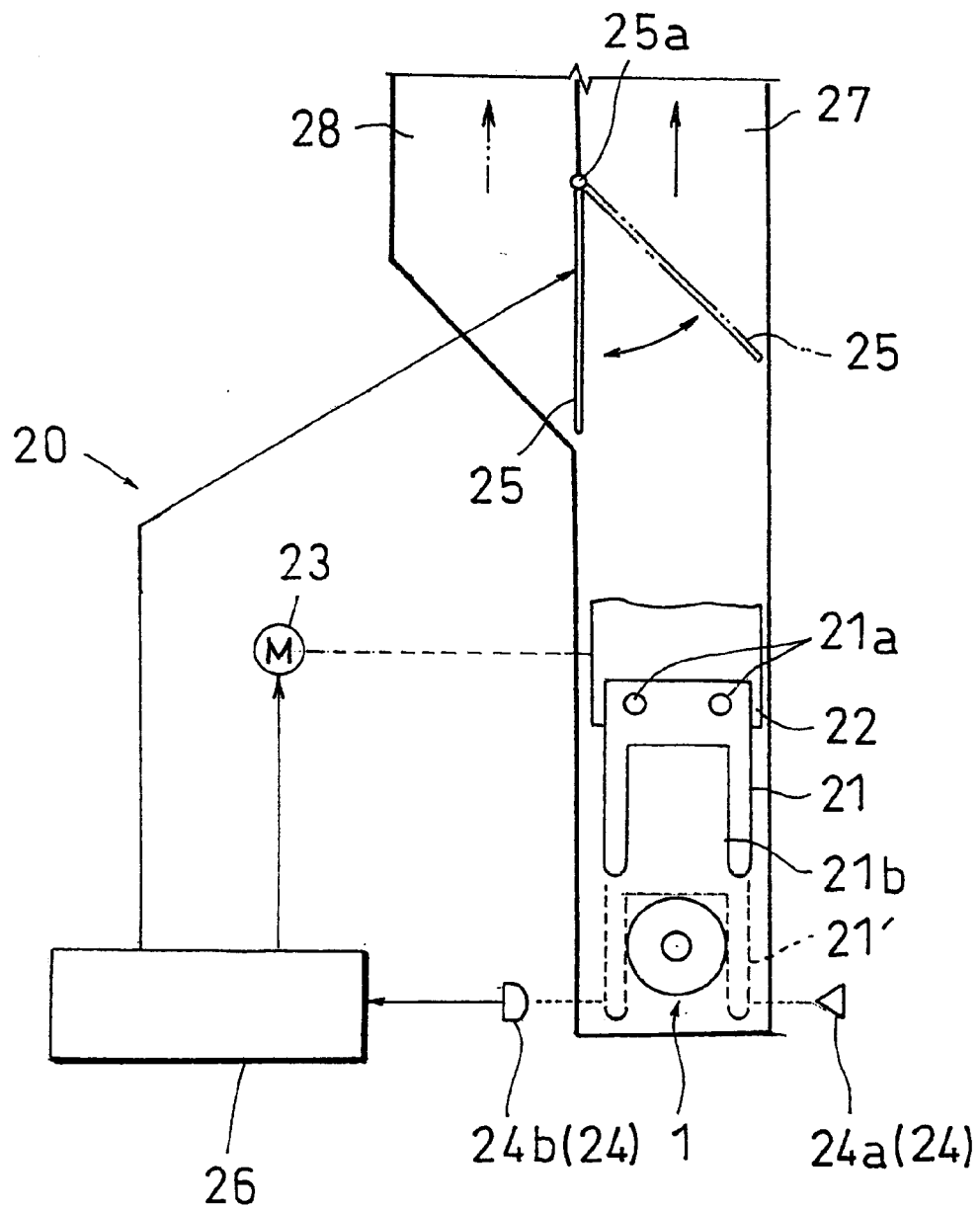
FIG. 8 is a plan view conceptionally showing a structure of an inspecting apparatus.
Figure 9:
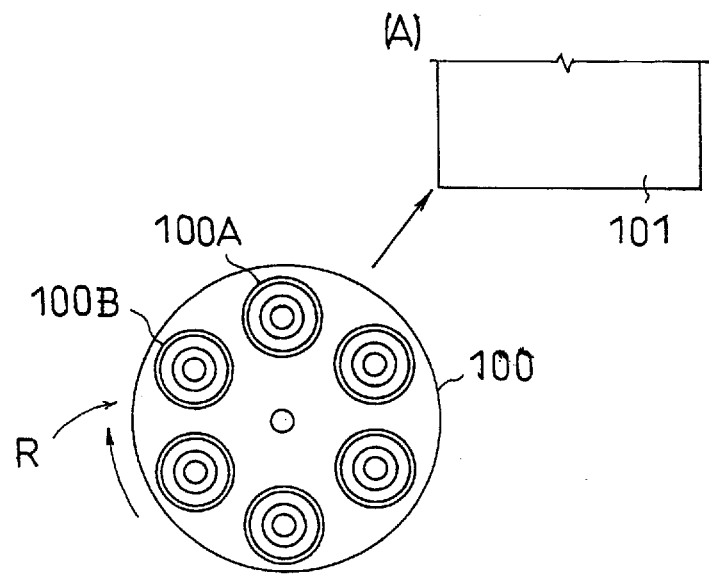
FIG. 9A is a plane view showing a structure a piling portion of a turning table of prior art.
FIG. 9B is a side view showing the structure the piling portion of the turning table of the prior art.
Figure 9:
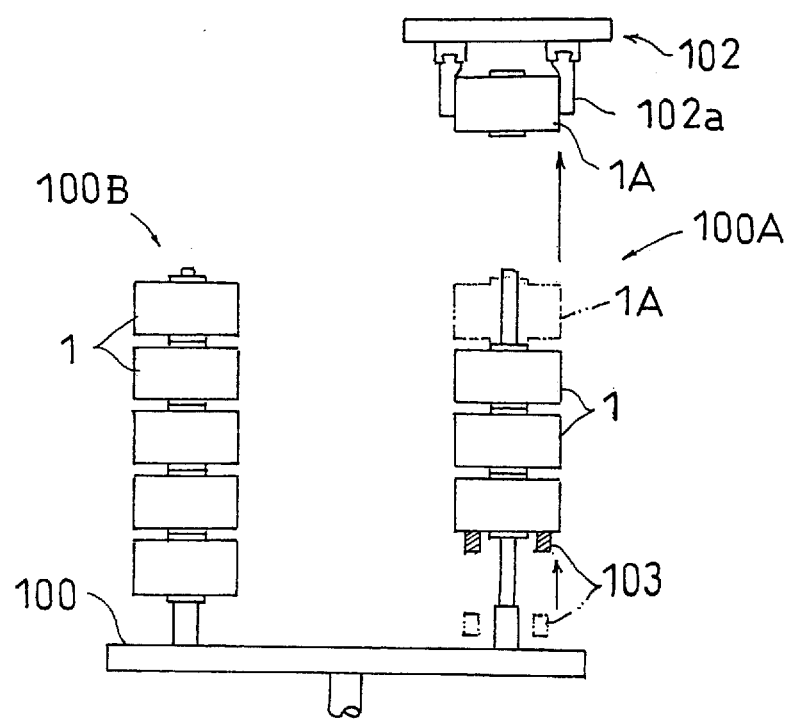

FIG. 8 is a plan view conceptually showing a structure of the inspecting apparatus 20. This inspecting apparatus 20 comprises a snap gage 21, a gage support body 22 for supporting the snap gage 21, a motor 23 for driving the snap gage 21, a sensor 24 for detecting a movement of the snap gage 21, and a switching plate 25.

The snap gage 21 includes two supporting holes 21a. By inserting pins formed on the gage support body 22 into the supporting holes 21a, the snap gage 21 is positioned and supported. The snap gage 21 includes a substantially U-shaped snapping portion 21b. If the outer diameter of the outer cylinder of the drawn rubber bush 1 is within specs, the rubber bush 1 can be snapped by the snapping portion 21b. That is, if the snap gage 21 is moved downward in FIG. 8, it can be moved to a position shown with a symbol 21' (shown with broken line). A position shown with a solid line in FIG. 8 is the first position, and a position shown with the broken line is the second position.

When the outer diameter of the outer cylinder of the rubber bush 1 is not within the specs (or managed value), that is, when the outer diameter is too large, it can not be snapped by the snapping portion 21b. Therefore, the snap gage 21 can not be moved to the position shown with the broken line in FIG. 8.

Thereupon an optical sensor 24 comprising a light-emitting portion 24a and a light-receiving portion 24b is provided so that it is possible to detect whether the snap gage 21 could snap the rubber bush 1. With this arrangement, it is possible to judge whether the quality of the drawn rubber bush 1 is good or not.

The motor 23 is shown for driving the snap gage 21, but the present invention is not limited to this, and another driving source such as a cylinder may be used instead.

The switching plate (which functions as a switching mechanism) 25 switches passages for sending out the inspected rubber bush 1 to one of a first passage 27 and a second passage 28. The switching plate 25 can rotate around a shaft core 25a. That is, a switching plate control section 26 functions as judging means for judging pass or fail of the rubber bush. When the inspected rubber bush 1 is "pass", it is sent out to the first passage 27, and if it is "fail", it is sent out to the second passage 28. The switching plate control section 26 controls a motion of the switching plate 25 based on an output signal from the optical sensor 24.

Although the embodiments and examples of application of the present inventions have been described with reference to the drawings above, it is apparent to a person skilled in the art that various modifications can be made without departing from a scope of the invention. Therefore, it will be understood that the invention can be carried out within a scope of claims in a manner that is not described.

What is claimed is:

1. A system for drawing an outer cylinder of a rubber bush including an inner cylinder serving as a shaft member, the outer cylinder disposed around the inner cylinder and a rubber elastic body interposed between the inner cylinder and the outer cylinder, comprising:

a first turning table having at least two piling portions on which the rubber bushes to be drawn are piled up in a vertical direction;

a second turning table having at least two piling portions on which the rubber bushes to be drawn are piled up in a vertical direction;

a first driving apparatus for bringing up said rubber bushes piled up on said piling portion of said first turning table to a predetermined robot grasping position;

a second driving apparatus for bringing up said rubber bushes piled up on said piling portion of said second turning table to a predetermined robot grasping position;

a drawing apparatus having a die for drawing the outer cylinder of said rubber bush;

a robot apparatus for grasping and transferring said rubber bush located at said robot grasping position to set the same to a predetermined position of said die;

a control apparatus for controlling the robot apparatus such that the rubber bushes from the piling portion of one of the first and second turning tables are sequentially transferred to the die, and if the transfer of all the former rubber bushes from the piling portion was completed, the rubber bushes from the piling portion of the other one of the first and second turning tables are transferred;

an inspection apparatus for inspecting a size of said outer cylinder of said rubber bush which was worked by said drawing apparatus;

a first passage for sending out said rubber bush which was judged as being a good product as a result of said inspection;

a second passage for sending out said rubber bush which as judged as being a bad product as the result of said inspection; and a switching mechanism for switching the first and second passages to which said rubber bush is sent out in accordance with the inspection result of said inspection apparatus, wherein said inspection apparatus comprises a snap gage, and judging means for judging that said rubber bush which could be snapped by said snap gage is the good product and said rubber bush which could not be snapped is the bad product.

2. The system according to claim 1, wherein said snap gage can move from a first position to a second position when said rubber bush is a good product, and can not move from said first position to said second position when said rubber bush is a bad product, the system is provided with a sensor for detecting a movement from the first position to the second position, and the switching mechanism is controlled based on a result of an output from the sensor.

3. A system for drawing an outer cylinder of a rubber bush including an inner cylinder serving as a shaft member, the outer cylinder disposed around the inner cylinder and a rubber elastic body interposed between the inner cylinder and the outer cylinder, comprising:

a drawing apparatus having a die for drawing the outer cylinder of said rubber bush;

an inspection apparatus for inspecting a size of said outer cylinder of said rubber bush which was worked by said drawing apparatus;

a first passage for sending out said rubber bush which was judged as being a good product as a result of said inspection;

a second passage for sending out said rubber bush which as judged as being a bad product as the result of said inspection; and a switching mechanism for switching the first and second passages to which said rubber bush is sent out in accordance with the inspection result of said inspection apparatus, wherein said inspection apparatus comprises a snap gage, and judging means for judging that said rubber bush which could be snapped by said snap gage is the good product and said rubber bush which could not be snapped is the bad product.

4. The system according to claim 3, wherein said snap gage can move from a first position to a second position when said rubber bush is a good product, and can not move from said first position to said second position when said rubber bush is a bad product, the system is provided with a sensor for detecting a movement from the first position to the second position, and the switching mechanism is controlled based on a result of an output from the sensor.

5. The system according to claim 3, further comprising a gage support body for supporting said snap gage, said snap gage is attachable and detachable to and from said gage support body.

* * * * *